(12) United States Patent
Baron

(10) Patent No.: US 8,266,929 B2
(45) Date of Patent: *Sep. 18, 2012

(54) PEDESTAL ISOLATOR

(75) Inventor: James A. Baron, Hilliard, OH (US)

(73) Assignee: Seicon Limited, Columbus, OH (US)

( * ) Notice: Subject to any disclaimer, the term of this patent is extended or adjusted under 35 U.S.C. 154(b) by 974 days.

This patent is subject to a terminal disclaimer.

(21) Appl. No.: 12/169,309

(22) Filed: Jul. 8, 2008

(65) Prior Publication Data

US 2009/0008527 A1    Jan. 8, 2009

Related U.S. Application Data

(63) Continuation-in-part of application No. 12/077,065, filed on Mar. 13, 2008.

(60) Provisional application No. 60/906,668, filed on Mar. 13, 2007.

(51) Int. Cl.
*D06F 39/12* (2006.01)

(52) U.S. Cl. .......................... 68/23.1; 267/136

(58) Field of Classification Search .................... 68/23.1
See application file for complete search history.

(56) References Cited

U.S. PATENT DOCUMENTS

| 6,595,483 B2 * | 7/2003 | Cunningham | 248/609 |
| 7,097,146 B2 * | 8/2006 | Tsai | 248/679 |

FOREIGN PATENT DOCUMENTS

| EP | 1757724 A2 * | 2/2007 |
| GB | 1155671 * | 5/1967 |

* cited by examiner

*Primary Examiner* — Michael Barr
*Assistant Examiner* — Jason Riggleman
(74) *Attorney, Agent, or Firm* — Porter, Wright, Morris & Arthur, LLP

(57) ABSTRACT

The pedestal isolator according to the present invention isolates a vibration source such as a front-loading washing machine from its surroundings. The vibration source is supported on elongated members that in turn are each supported on a pair of knife-edge supports. Ends of the elongated members are restrained from longitudinal movement. The distance between the pair of knife edge supports may be fixed or adjustable based on the expected vibration frequency.

24 Claims, 14 Drawing Sheets

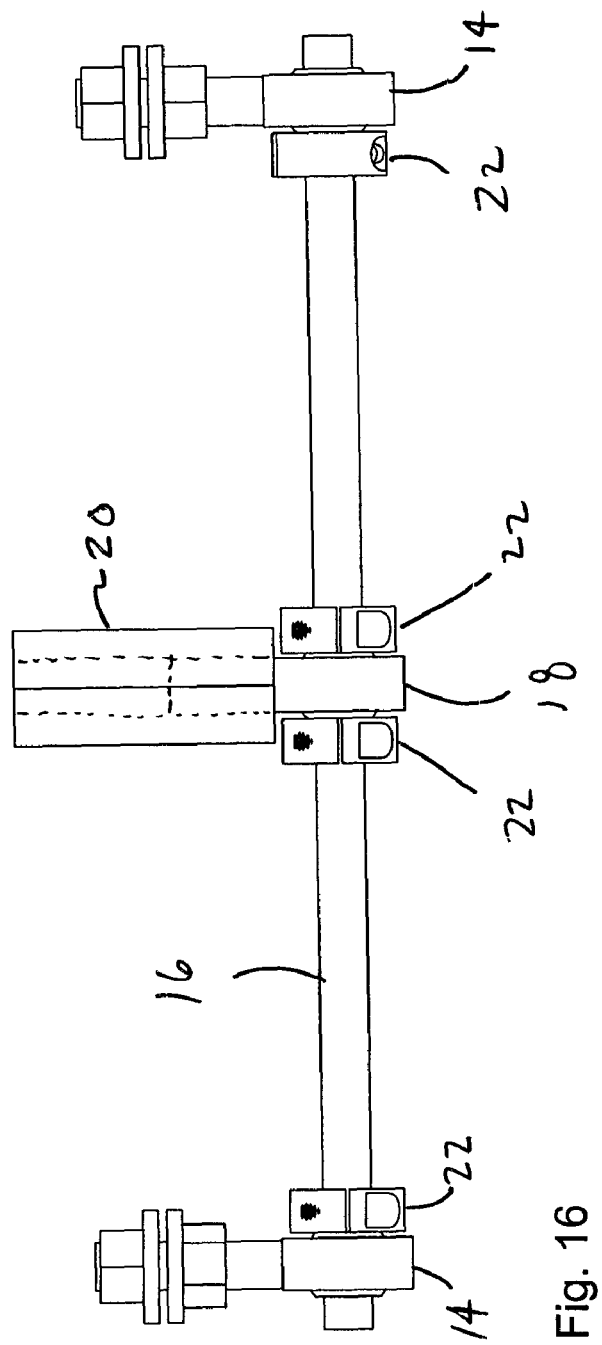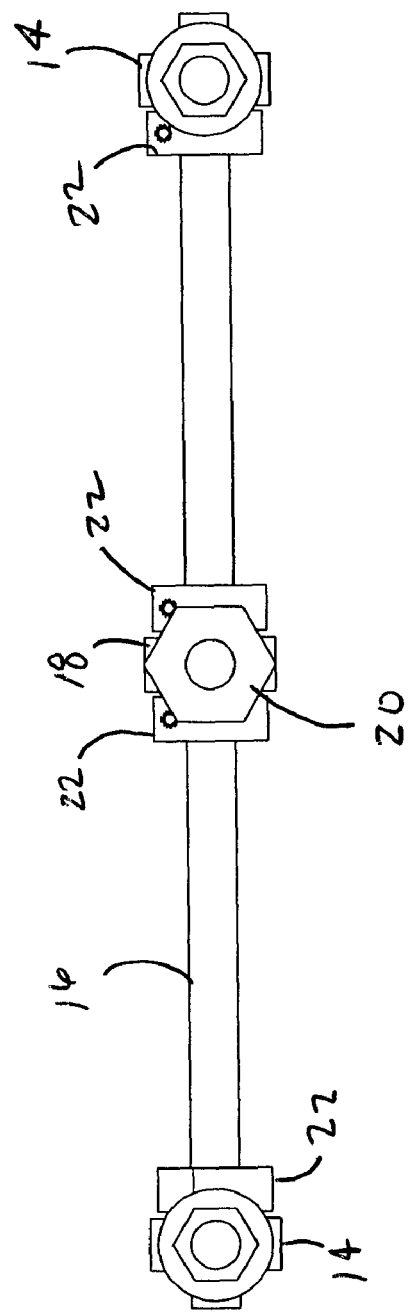
Fig. 16
Fig. 17

PEDESTAL ISOLATOR

CROSS-REFERENCE TO RELATED APPLICATIONS

This application is a continuation-in-part of U.S. patent application Ser. No. 12/077,065 filed on Mar. 13, 2008 which claims the benefit of U.S. Provisional Patent Application No. 60/906,668, filed Mar. 13, 2007, the disclosures of which are expressly incorporated herein in their entireties by reference.

STATEMENT REGARDING FEDERALLY SPONSORED RESEARCH

Not applicable

REFERENCE TO MICROFICHE APPENDIX

Not applicable

FIELD OF THE INVENTION

The field of the present invention relates to structures that support and isolate vibration originating from an object that is supported by the structure, and more particularly, to such structures that support and isolate vibration from machines for industrial or consumer use including but not limited to automatic washing machines.

BACKGROUND OF THE INVENTION

Washing machines, air conditioners, and other machines frequently cause noise and/or vibration during operation. Conventional washing machines, for example, employ dampers between the vibrating drum and the frame. Some of the vibrational energy is lost as heat while the rest is transmitted to the frame. User response to this transmitted vibration or noise may range from minor annoyance to major aggravation.

Noise and vibration problems may be exacerbated when the machines are placed in locations close to living or sleeping areas; noise or vibration from a first floor laundry room is more likely to disrupt conversations, television watching, or the like in other first floor rooms than noise or vibration from a basement laundry room. Similarly, noise from or vibration from a second floor laundry room is more likely to disrupt sleep than noise from a laundry room located on a different level. Noise and vibration problems also may originate from machines operated by others when individuals work or reside in close proximity to others, as is frequently the case in urban environments and attached residences.

Noise and vibration problems also may be exacerbated when machines are installed in locations that tend to transmit rather than disperse vibration. Washing machines on upper building floors (i.e., not on a basement or slab floor) may readily transit noise and vibration throughout the building. Air conditioners installed on platforms extending from the wall of the building rather than on a concrete pad may also transmit noise and vibration.

Excessive vibration also may cause disruption or damage in addition to adversely affecting user comfort, particularly with machines that include rotating shafts. Excessive vibration also may result in movement of the machine relative to the support surface, which in turn may cause problems including disruption of machine operation or physical damage. Movement of the machine relative to its support can disrupt machine operation, mark or tear finished flooring, or cause water damage if a water supply hose is damaged or disconnected. The forces associated with rotating shafts also may cause damaging movement or vibration of the machine structures that support the shafts and retain them in position.

Manufacturers of machines such as washers and air conditioners have endeavored to produce quieter units but have not consistently achieved success. Machines that exhibit satisfactory performance in an idealized test situation may nevertheless cause undesirable noise and vibration if they are located in an environment that does not allow the vibration to dissipate. Traditional damping methods such as placement of elastomeric or similar pads under the machine also have had only limited success.

Although various solutions to this problem have been proposed, none to date have provided a reliable and inexpensive solution. A need exists for an apparatus that effectively isolates vibration at all stages of operation, allows movement of the appliance from one location to another if desired, is usable with a wide range of appliance brands and models, and is inexpensive. Preferably the apparatus would be usable with successive appliances, although it also may be possible to incorporate the apparatus into the appliance.

SUMMARY OF THE INVENTION

The present invention provides isolators which address some of the above-noted problems of the prior art. Disclosed herein are vibration isolators for supporting an object that may vibrate continuously or intermittently and isolating that vibration from the surrounding environment. The vibration isolators include elongated members supported at ends by two supports, preferably knife-edge support isolator (KESI) units. The elongated members are restrained from longitudinal motion. Central connectors on the elongated members between the two supports carry the load.

Disclosed herein is an isolator for a vibration source comprising a base, n elongated members wherein $n \geq 3$, wherein each of the elongated members has opposing ends and a central portion intermediate the ends, and a plurality of knife-edge supports secured to the base and engagingly supporting each of the n elongated members at positions spaced inwardly from the ends such that the ends are restrained from longitudinal movement. A plurality of connectors are provided for directly connecting and supporting the vibration source. The connectors are secured to the central portions of the n elongated members.

Also disclosed herein is a pedestal in combination with a front-loading washing machine comprising a front loading washing machine, a base, n elongated members wherein $n \geq 3$, wherein each of the elongated members has opposing ends and a central portion intermediate the ends, and a plurality of knife-edge supports secured to the base and engagingly supporting each of the n elongated members at positions spaced inwardly from the ends such that the ends are restrained from longitudinal movement. A plurality of connectors are directly connected to and support the washing machine. The connectors are secured to the central portions of the n elongated members.

Also disclosed herein is pedestal in combination with a front-loading washing machine comprising a front loading washing machine, a base, n elongated members wherein $n=4$, wherein each of the elongated members has opposing ends and a central portion intermediate the ends, and a plurality of knife-edge supports secured to the base and engagingly supporting each of the n elongated members at positions spaced inwardly from the ends such that the ends are restrained from longitudinal movement. A plurality of connectors are directly connected to and supporting the washing machine. The connectors are secured to the central portions of the n elongated members. The washing machine has a spinning basket which spins about a horizontal spinning axis and at least one of the elongated members is arranged in substantially parallel relationship with the spinning axis.

From the foregoing disclosure and the following more detailed description of various preferred embodiments it will be apparent to those skilled in the art that the present invention provides a significant advance in the technology and art of vibration isolation systems. Particularly, significant in this regard is the potential the invention affords for providing a reliable, inexpensive, and effective vibration isolation system for front-loading washing machines. Additional features and advantages of the invention will be better understood in view of the detailed description provided below.

BRIEF DESCRIPTION OF THE DRAWINGS

These and further objects of the invention will become apparent from the following detailed description:

FIG. 16 is a side view of a KESI unit of the pedestal isolator of FIGS. 11 to 13;

FIG. 17 is a side view of the KESI unit of FIG. 16;

Figure 10:
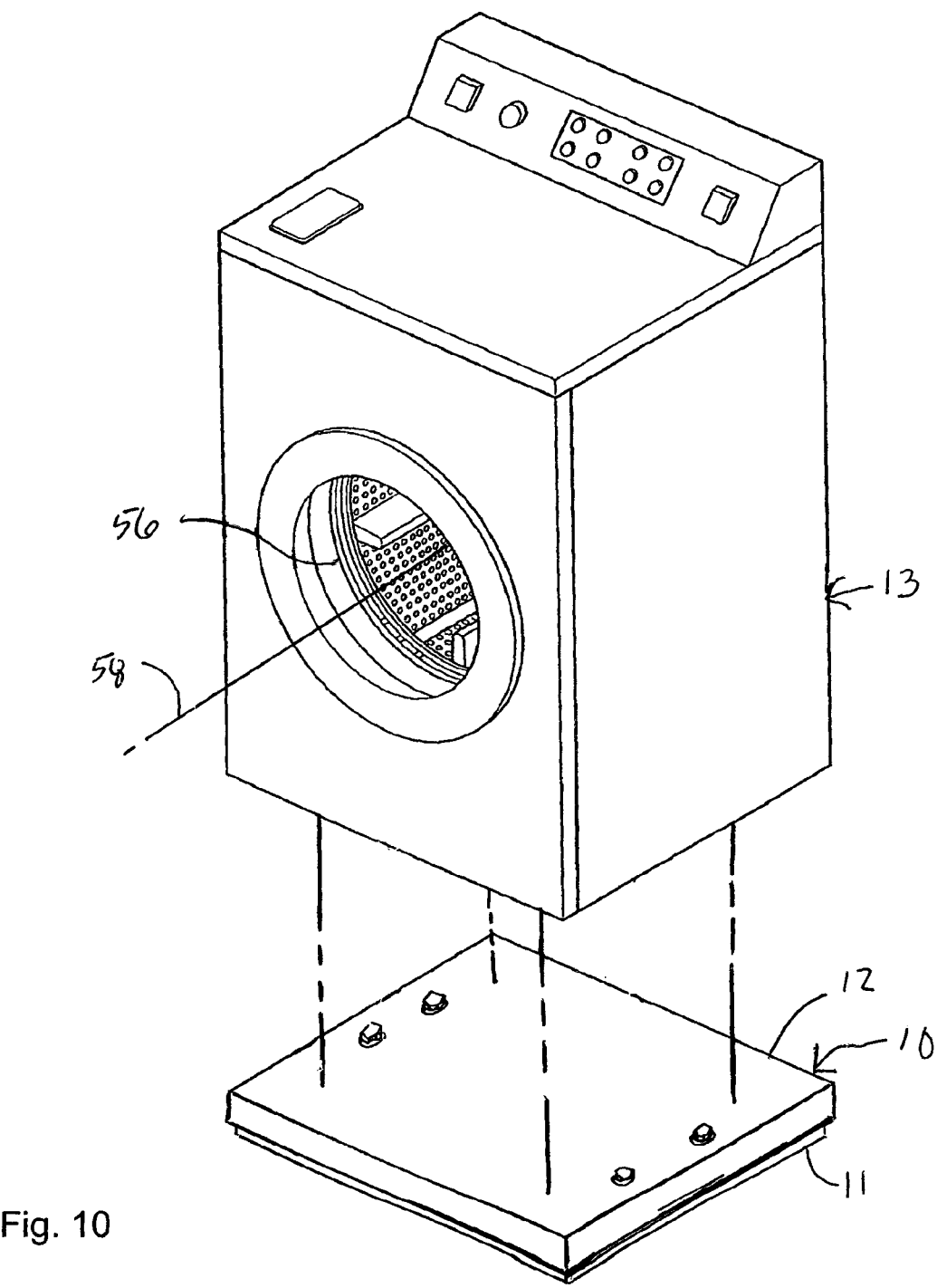
FIG. 10 is a perspective view of a front-loading washing machine resting on the platform isolator of FIGS. 1 to 3.

It should be understood that the appended drawings are not necessarily to scale, presenting a somewhat simplified representation of various preferred features illustrative of the basic principles of the invention. The specific design features of the various isolators as disclosed herein, including, for example, specific dimensions, orientations, locations, and shapes will be determined in part by the particular intended application and use environment. Certain features of the illustrated embodiments have been enlarged or distorted relative to others to facilitate visualization and clear understanding. In particular, thin features may be thickened, for example, for clarity or illustration. All references to direction and position, unless otherwise indicated, refer to the orientation of the isolators illustrated in the drawings. In general, up or upward generally refers to an upward direction in FIGS. 10 and 11 and down or downward generally refers to a downward direction in FIGS. 10 and 11. Also in general, fore or forward generally refers to a direction toward the left in FIGS. 10 and 11 and aft or rearward generally refers to a direction toward the right in FIGS. 10 and 11.

DETAILED DESCRIPTION OF CERTAIN PREFERRED EMBODIMENTS

The present invention provides isolators which isolate a vibration source from its surroundings. The present invention is described herein with particular reference to isolators useful in isolating vibrations of front-loading washing machines from their surroundings although the utility of the invention is not limited to the particular illustrative embodiments.

FIGS. 1 to 3 and 10 illustrate a platform assembly or platform isolator 10 according to the present invention. The platform isolator 10 includes a platform 12 and a base 11. The platform 12 forms a generally horizontal upper support surface upon which rests support feet of a front loading washing machine or other vibration source 13. The platform 12 is supported on knife-edge support isolator (KESI) units 15 located between the platform 12 and the base 11 to isolate the platform 12, and the washing machine 13 resting thereon, from the base 11. The illustrated KESI units 15 each comprise an elongated member 16, knife-edge supports 14 supporting ends of the elongated member 16, and a connector 18 securing the load to the elongated member 16 between the knife-edge supports 14 as described in more detail hereinafter.

For platform isolators 10 intended for use with a fixed frequency vibration source, the distance between a pair of the knife edge supports 14 may be fixed, with the distance being selected that is appropriate for the expected vibration frequency. The distances do not necessarily need to be equal but an equidistant arrangement may improve the performance of the platform isolator 10. If desired, the platform isolator 10 may be constructed such that the surface for supporting the knife-edge supports 14 defines a plurality of bores, with each vibration frequency of a given elongated member 16 changing based on the pair of bores in which its knife-edge supports 14 are installed. This approach will allow a manufacturer or installer to select an appropriate vibration frequency from among designated "pre-sets" to accommodate minor changes in vibration frequency from one brand or model of machine to another.

For platform isolators 10 intended for use with vibration sources capable of producing a broad spectrum of frequencies, a mechanism may be provided for adjusting the resonant frequency of the plat form isolator 10. This may be accomplished, for example, by changing the distance between the respective knife-edge supports 14 on which at least one elongated member 16 is supported. In one preferred embodiment, the adjustment mechanism may comprise a continuously adjustable threaded rod which changes the distance between a pair of the knife-edge supports 14.

In one preferred embodiment, the platform 12 may define the upper surface of an enclosed structure, which may be constructed using conventional methods. The platform 12 may be constructed from wood, a polymeric material, metal, a composite material, or a combination of these. The platform 12 may define a continuous surface or a web adapted for support on the connectors 18 secured to the central portions of the elongated members 16. The size and material of the construction material for the platform 12 are chosen based on the size and weight of the vibration source and the environmental conditions in which the platform isolator 10 will operate. Other components such as the base 11 that, in combination with the platform 12, define an open-or closed-end enclosure may be constructed from any of the same materials.

Figure 4:
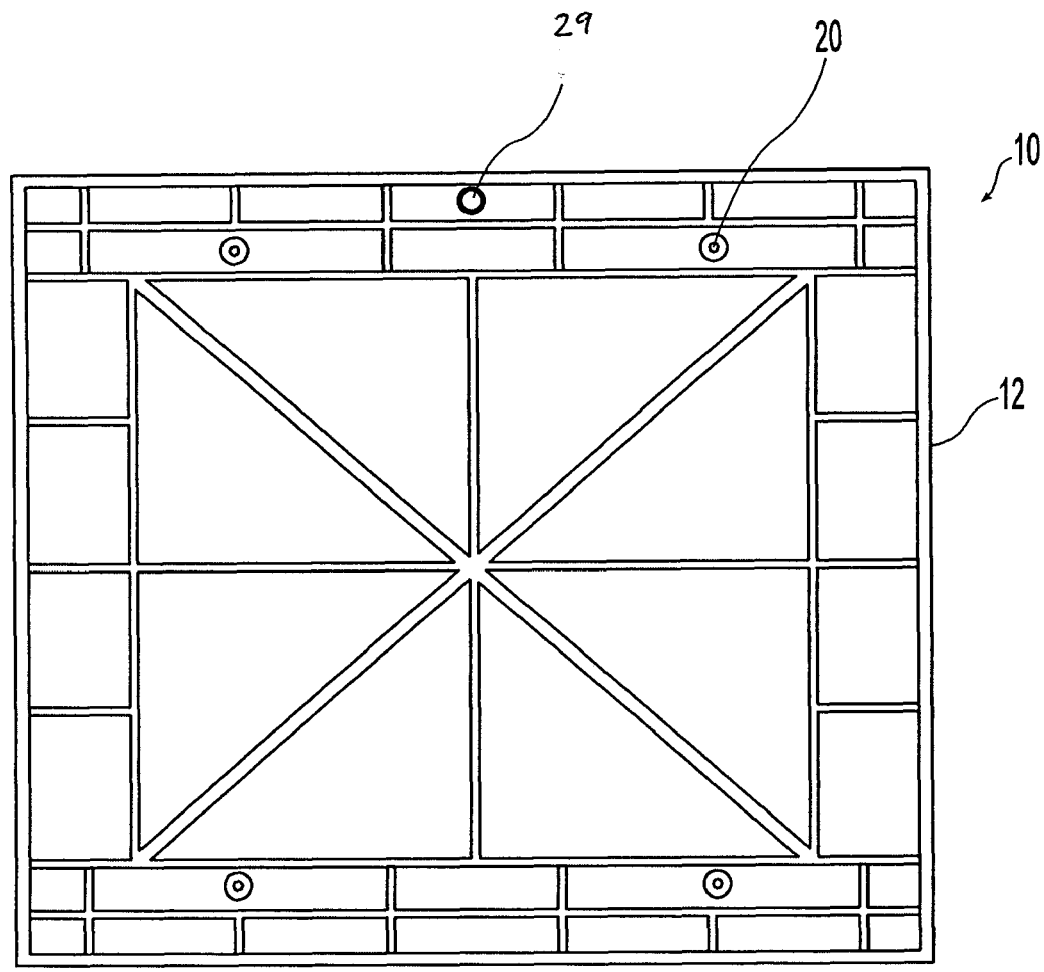
FIG. 4 is a bottom view of a variation of a platform of the platform isolator of FIGS. 1 to 3, wherein the platform is provided with a drain pan and drain port.
Figure 5:
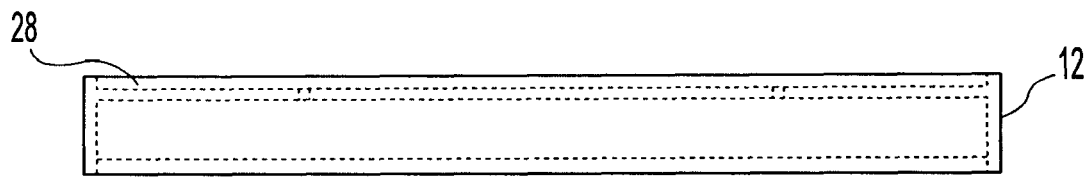
FIG. 5 is a side view of the platform of FIG. 4.

As best shown in FIGS. 4 and 5, the platform 12 may function as a drain pan 28 to collect liquid such as water or lubricating oil that may be released from or in the vicinity of the machine. A drain port 29 may be provided in the platform 12 to direct the liquid collecting in the drain pan 28 to a desired outlet. The platform 12 illustrated in FIGS. 4 and 5 is molded of plastic and an integral drain pan 28 but it is note that the drain pan 28 can alternatively be formed in any other suitable manner.

The platform isolator 10 according to the present invention comprises n elongated members 16, where n≧3. The illustrated platform isolator 10 includes four of the KESI units 15, that is, four of the knife-edge supported elongated members 16. It is noted, however, that at any other suitable quantity of three or more of the KESI units 15 can alternatively be utilized.

Figure 7:
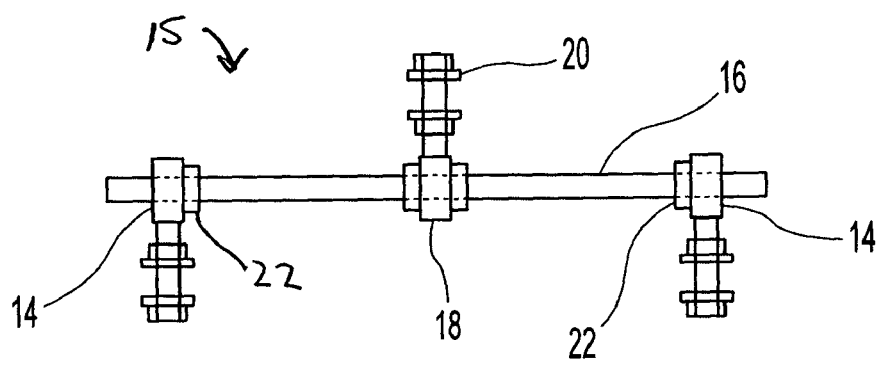
FIG. 7 is a side elevation view of a KESI unit of the platform isolator of FIGS. 1 to 3.

As best shown in FIG. 7, each elongated member 16 has opposing end portions and a central portion intermediate the end portions. A pair of the knife-edge supports 14 is provided which engage the end portions of elongated members 16 and the connector 18 or other load is supported on the central portion of the elongated members 16. In one embodiment, the knife-edge supports 14 may be spherical-joint rod ends, spherical joint bearings, or other suitable supports including radius bore supports that both engage the ends of the elongated members 16 and limit the movement of the members 16 in a longitudinal direction (i.e., along the long axis of the elongated member 16). Longitudinal motion of the elongate member ends also may be restricted by collars 22 clamped to the elongated members 16.

Figure 8B:
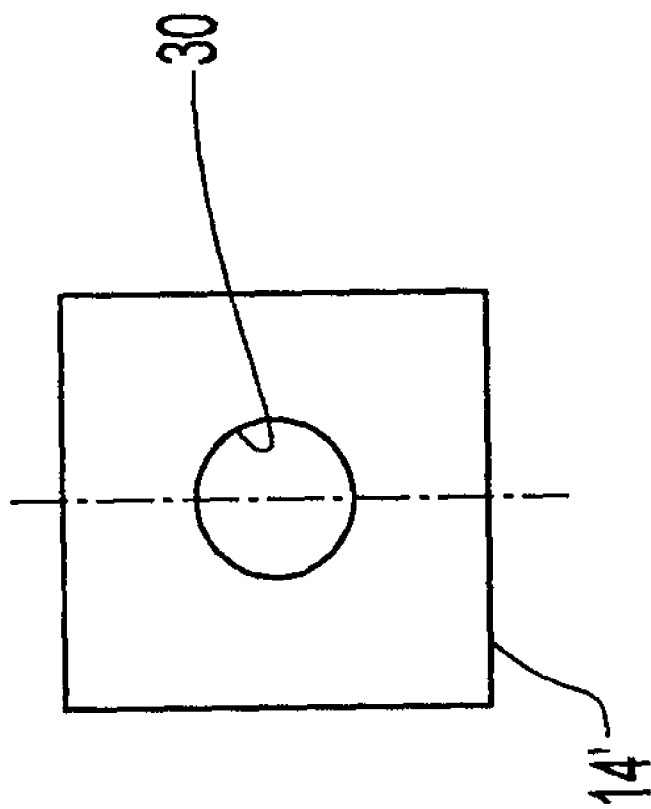
FIGS. 8A and 8B are detail side and front elevation views of a radius bore support.
Figure 8A:
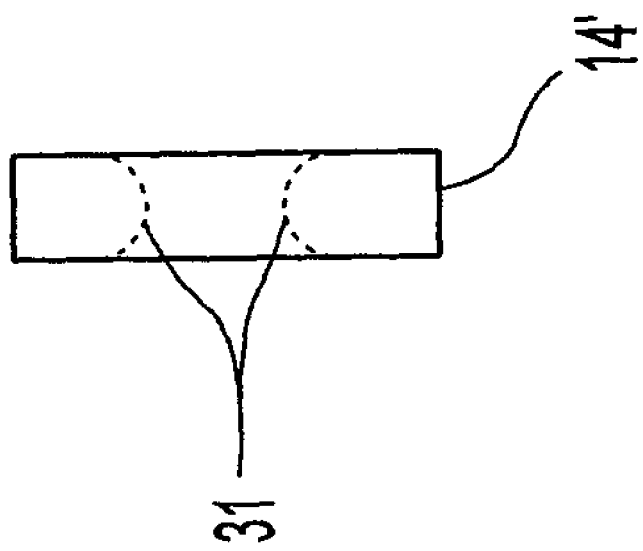

The connector 18 on the central portion of the elongated member 16 can a spherical-joint rod end, spherical joint bearing, or other suitable knife-edge support 14 secured in position by a pair of the collars 22 clamped to the elongated member 16 on opposed sides. For example, as shown in FIGS. 8A and 8B, the connector may comprise a radius bore support 14'. A unitary radius bore support 14' may comprise a washer in which the surface of the central bore 30 is fashioned with an internal radius 31 on which an elongated member 16 inserted through the central bore 30 may be supported while allowing the member 16 to slide and pivot relative to the support 14'.

The elongated members 16 may be rods, shafts, plates, beams, or any other suitable elongated structure. Rods having a circular cross section are believed to yield superior results in some applications but other cross sectional shapes or structural forms may be preferred in other applications. The elongated members 16 may be constructed from any suitable material including but not limited to fiberglass-reinforced epoxy and other composite materials. The configuration and composition of the elongated members 16 may vary with the vibrational frequencies to be isolated and the environmental demands of the location where the platform isolator 10 is used.

Knife-edge support of the illustrated elongated member 16 is provided by three spherical-joint rod ends. One rod end, positioned at the central portion of the elongated member 16, is attached to the platform 12 by a mount 20 and serves as the connector 18. The illustrated mount 20 is in the form a threaded rod extending from the rod end through an opening in the platform and two nylon lock nuts and two washers cooperating with the threaded rod (best shown in FIG. 3). It is noted, however, that any other suitable fasteners may alternatively be used to form the mount 20. The two remaining rod ends, positioned at the end portions of the elongated member 16, are attached to the base 11. The illustrated rod ends at the end portions of the elongated member 16 are each anchored to the base 11 by a threaded rod extending from the rod ends through an opening in the base 11 and two nylon lock nuts and two washers cooperating with the threaded rod (best shown in FIG. 3). It is noted, however, that any other suitable fasteners may alternatively be used. It is also noted that the knife-edge supports 14 may be anchored directly into the base 11 if the base construction is capable of receiving the knife edge supports 14. For example, integral receptacles for the knife-edge supports 14 can be molded directly in the base 11 when the base 11 is molded of plastic or the like. Also, suitable receivers such as inserts may be provided within the base 11 for anchoring the knife-edge supports 14.

The knife-edge supports 14 may be arranged such that the elongated members 16 are positioned to support the size and weight of the platform 12 and the vibration source 13 supported thereon and respond to the expected vibration frequencies of the source. Any configuration of three or more elongated members 16 (other than a collinear three-member arrangement) may be used. The elongated members 16 may be supported in substantially the same horizontal plane or in different horizontal planes.

Figure 1:
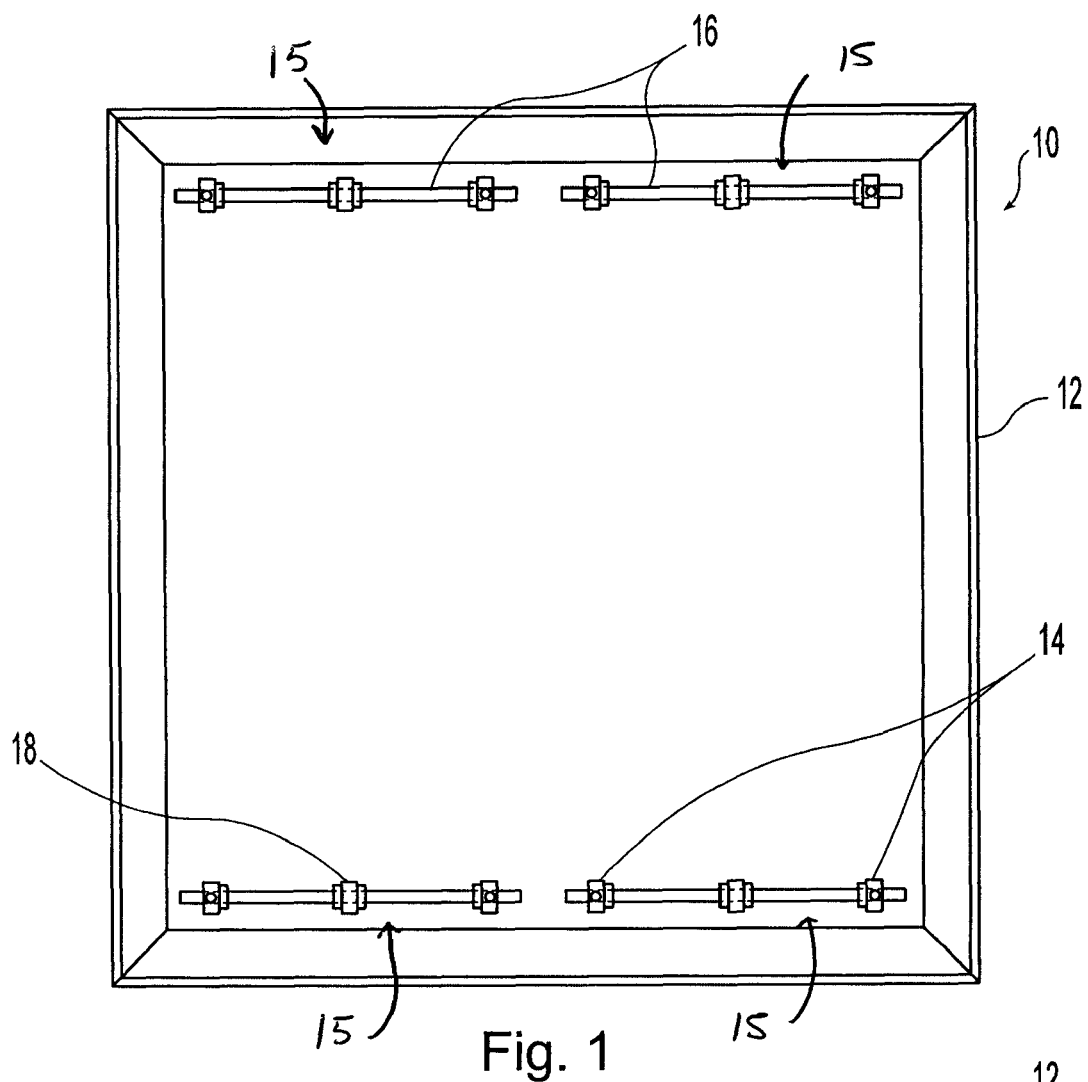
FIG. 1 is a bottom view of a platform isolator according to the present invention.
Figure 2:
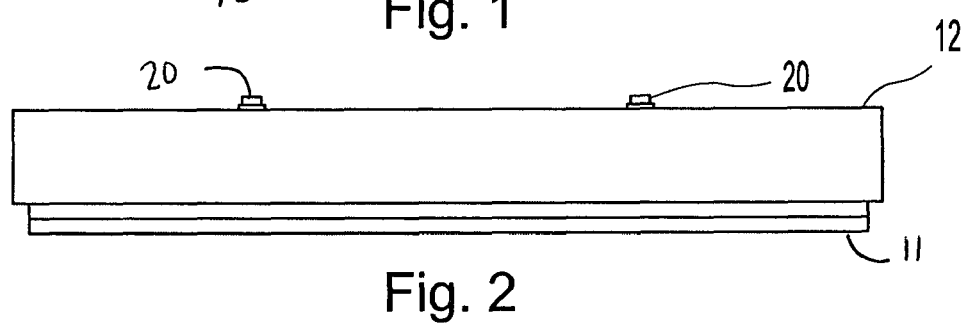
FIG. 2 is a side view of the platform isolator of FIG. 1.
Figure 3:
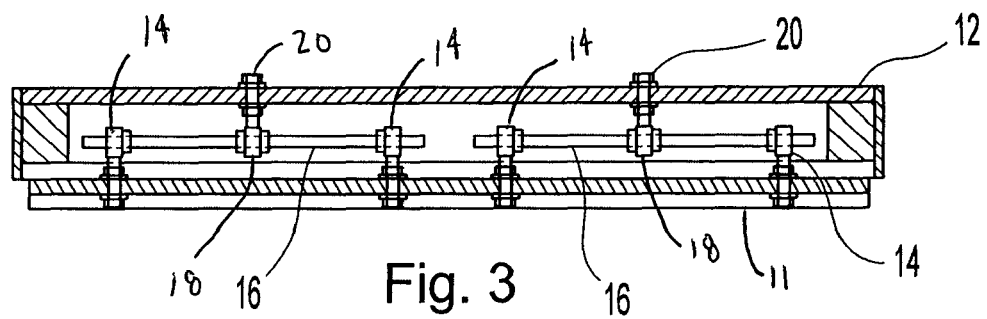
FIG. 3 is a side view in cross-section of the platform isolator of FIGS. 1 and 2.

During operation, the mobility of the vibrating equipment 13 increases as a result of the softness of the platform isolator 10. If the space around the isolated equipment 13 is confined or the application otherwise does not allow such mobility, the arrangement of the knife-edge supported members 14 may be selected to limit this mobility. Orientation of the elongated members 16 parallel to each other, as shown in FIG. 1, reduces lateral mobility of the isolated equipment in the vertical plane perpendicular to the longitudinal axes of the elongated members 16. Conversely, if no lateral space restrictions exist in the installation, the knife-edge supported members 16 may be arranged in other patterns, for example, at right angles to each other as shown in FIG. 6.

Figure 6:
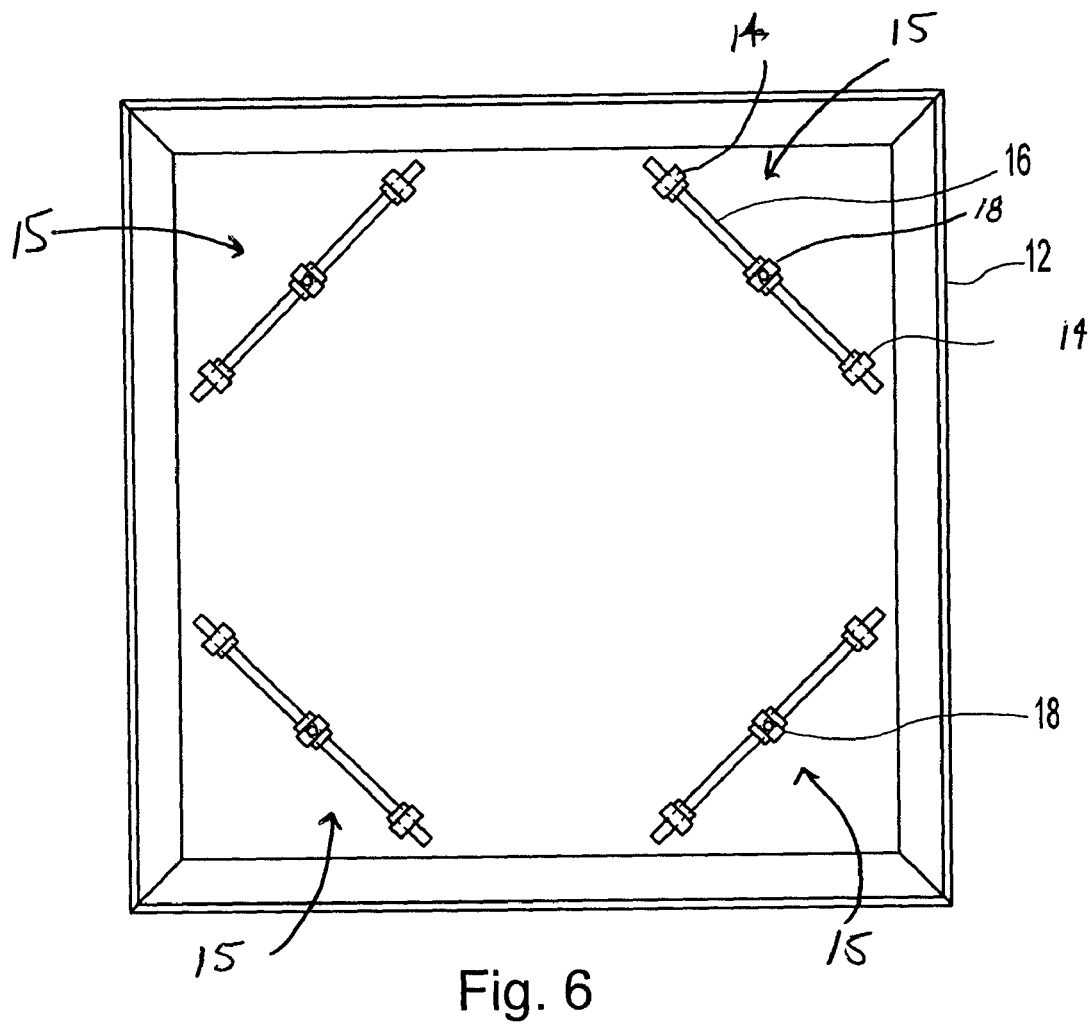
FIG. 6 is a bottom view of a variation of the platform isolator of FIGS. 1 to 3, wherein KESI units are positioned in a different configuration.

The parallel arrangement of the four KESI units 15 shown in FIG. 1 and the angular arrangement of the four KESI units 15 shown in FIG. 6 were selected to control the range of rocking motion of an exemplary vibration source (a washing machine) 13 on the platform 12, but this does not exclude other arrangements for this or other applications. The angular arrangement of the elongate members 16 shown in FIG. 6 is particularly preferred in that maximum isolation is realized in all axes with a small platform 10 footprint. This arrangement, however, places the knife-edge supports 14 of the connectors 20 closer to the pivoting center of the platform 12, which allows for more lateral motion of the machine 13. Note that supports 14 located in the vicinity of the corners may provide superior results.

Figure 9:
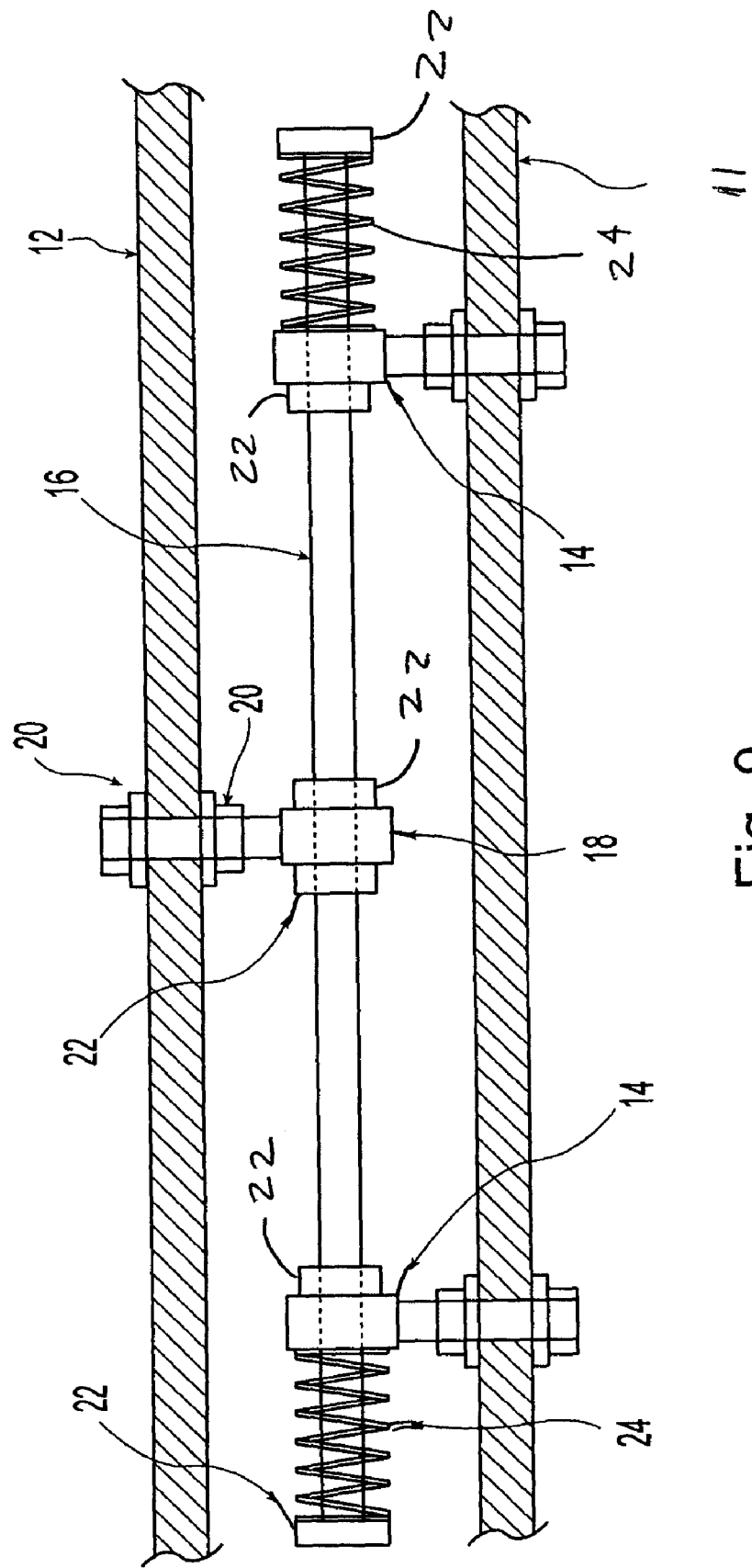
FIG. 9 is a side elevation view of the KESI unit of FIG. 7, wherein springs are used to vary the response of the knife-edge supported elongated members.

As best shown in FIG. 9, if desired, springs 24 may be provided on opposing ends of one or more of the elongated members 16 between the knife-edge support 14 and the corresponding end portions of the elongated member 16. This may be accomplished, for example, by providing a compression spring 24 having one end acting on an end portion of the elongated member 16 or a shaft collar 22 provided on the elongated member 16 and the other end of the spring 24 acting on the knife-edge support 14. Compression of the spring 24 increases a vector component of friction on the elongated member 16 and decreases its effective static deflection. Evidence suggests that this may improve system performance through resonance.

It is expected that vibration frequencies for at least some applications will be within a narrow enough range that the platform isolator 10 may be configured to accommodate this range of vibration frequencies without adjustment. If desired, however, the platform isolator 10 may be tuned to the resonant frequency of interest using an adjustment mechanism. As described above, this may be accomplished by changing the distance between the respective knife-edge supports 14 on which at least one of the elongated members 16 is supported. In a preferred embodiment, the adjustment mechanism may comprise a continuously adjustable threaded rod which changes the distance between a pair of knife edge supports 14. The platform isolator 10 may include an automated system that monitors the vibration frequency, compares it to a standard value, and adjusts the distance between the knife edge supports 14. For example see U.S. Pat. No. 7,086,509, the disclosure of which is expressly incorporated herein in its entirety by reference.

Figure 11:
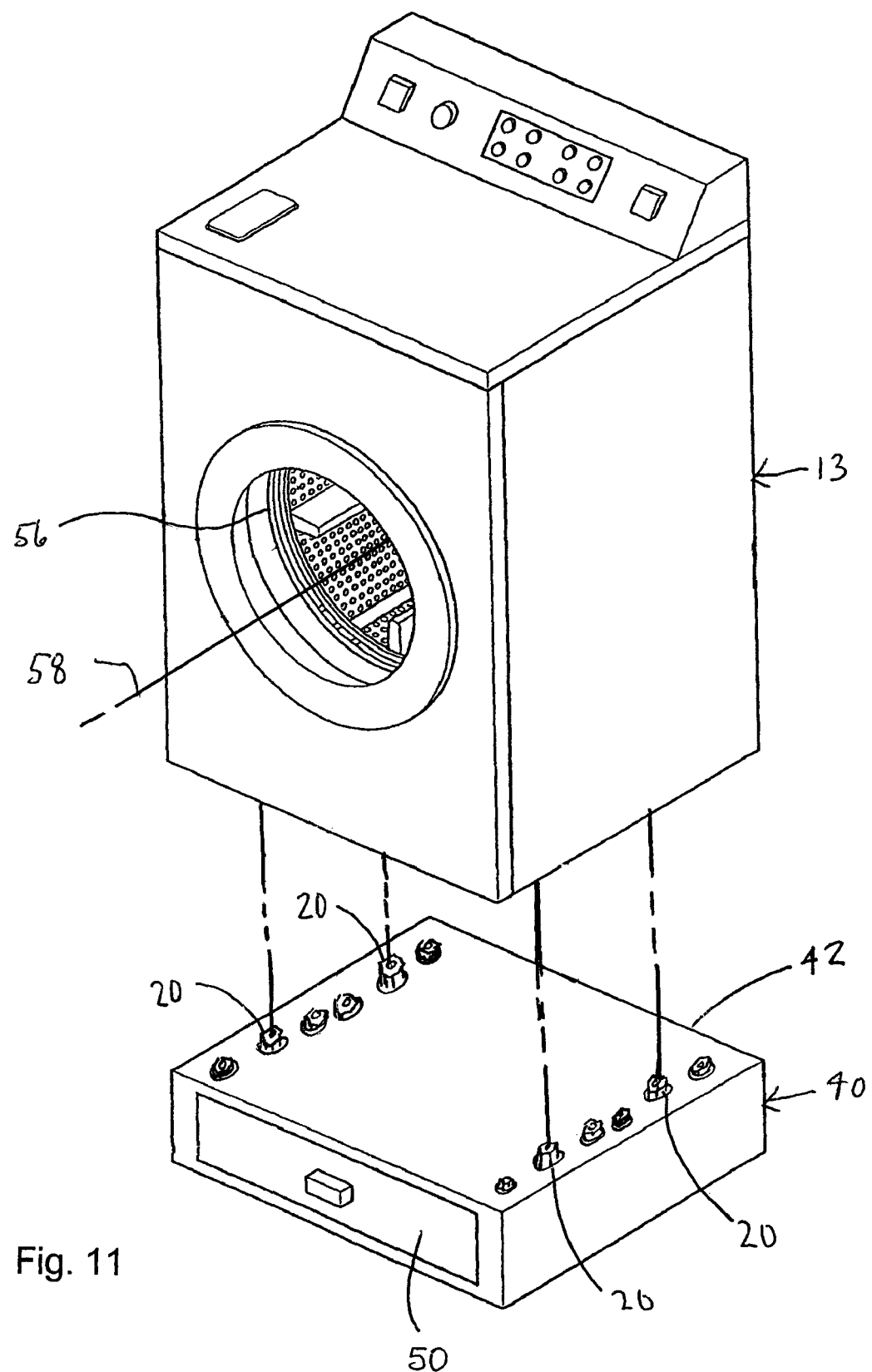
FIG. 11 is a perspective view of a front-loading washing machine secured to a pedestal isolator according to another embodiment of the present invention.
Figure 12:
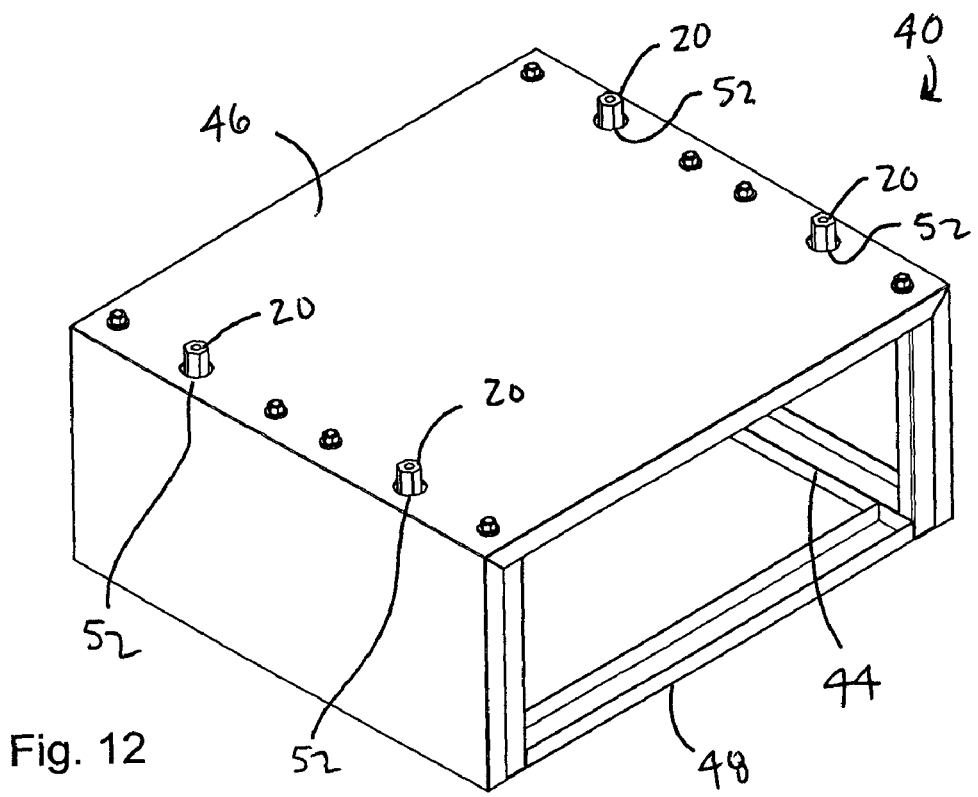
FIG. 12 is a top perspective view of the pedestal isolator of FIG. 11, wherein components are removed for clarity.
Figure 13:
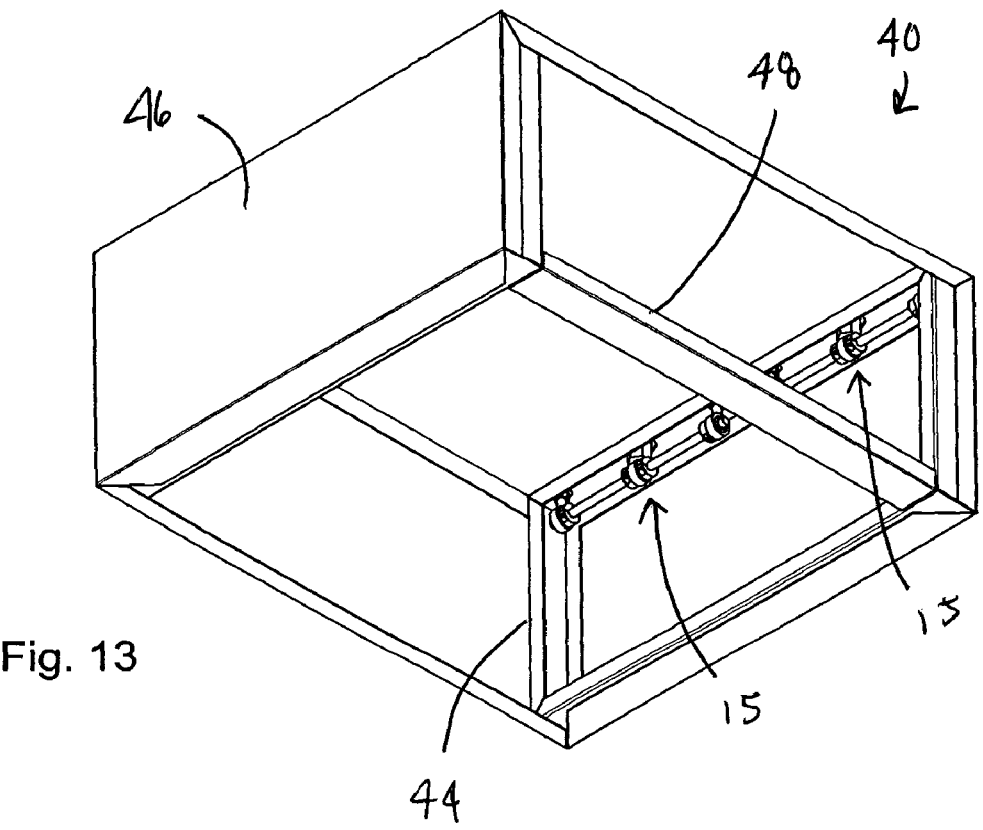
FIG. 13 is a bottom perspective view of the pedestal isolator of FIGS. 11 and 12, wherein components are removed for clarity.

FIGS. 11 to 13 illustrate a pedestal assembly or pedestal isolator 40 according to another embodiment of the present invention. The pedestal isolator 40 is similar to the platform isolator 10 described hereinabove and like reference numbers are utilized to indicate like structure. The pedestal isolator 40 illustrates that the connectors 18 can be secured directly to the washing machine 13 rather than to the platform 12 and the platform 12 can be eliminated. The pedestal isolator 40 also illustrates that the KESI units 15 can be located within the base 11 rather than within the platform 12.

The illustrated pedestal isolator 40 includes a base or pedestal 42 and a plurality of KESI units 15 located between the pedestal 42 and a front loading washing machine or other vibration source 13. The washing machine 13 is directly connected to and supported on the KESI units 15 to isolate the washing machine 13 from the pedestal 42. The KESI units 15 can be secured to any suitable portion of the frame of the washing machine 13. It is believed that the KESI units 15 can be attached to the washing machine 13 at attachment points where support feet would otherwise be secured.

The illustrated pedestal 42 is a rectangular-shaped structure forming a hollow interior space and sized and shaped for supporting the washing machine 13. The illustrated pedestal 42 includes a pair of laterally spaced apart side frames 44 and a housing or cover member 46 extending over the side frames 44 which encloses the top, left and right sides, and rear of the pedestal 42. The cover member 46 can be secured to the side frames 44 in any suitable manner. A lateral support 48 extends between the side frames 44 at the front bottom of the side frames 44. A storage drawer 50 is selectively inserted and withdrawn through an opening in the front side of the pedestal 42. It is noted that the drawer 50 can be eliminated if desired. The pedestal 42 can alternatively have any other suitable construction. The illustrated pedestal 42 is constructed of sheet metal but alternatively can be constructed from any other suitable material or combinations of materials such as, for example, wood, polymeric material, metal, composite material, or any combination of these.

Figure 14:
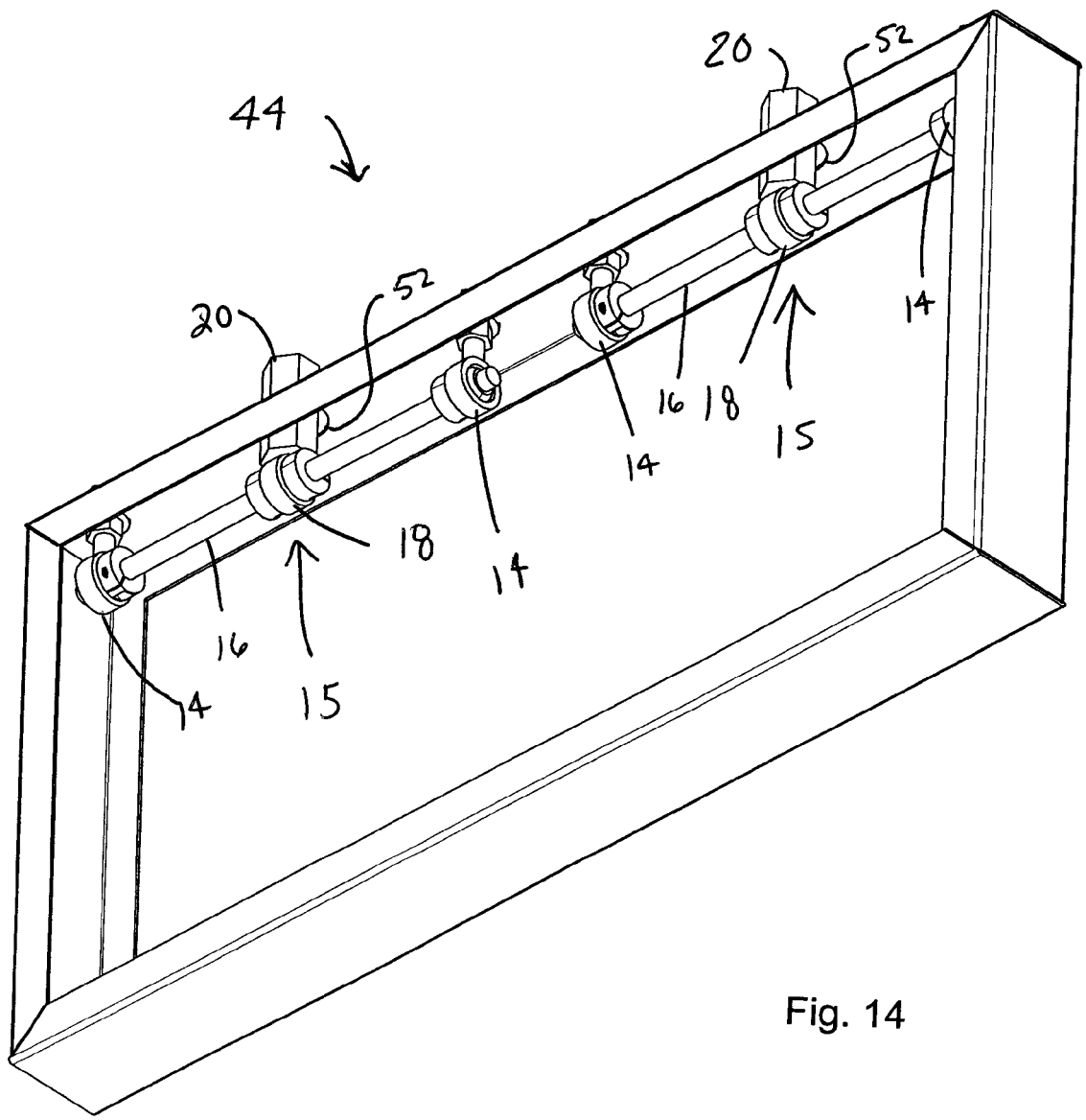
FIG. 14 is a perspective view of a side frame of the pedestal isolator of FIGS. 11 to 13.
Figure 15:
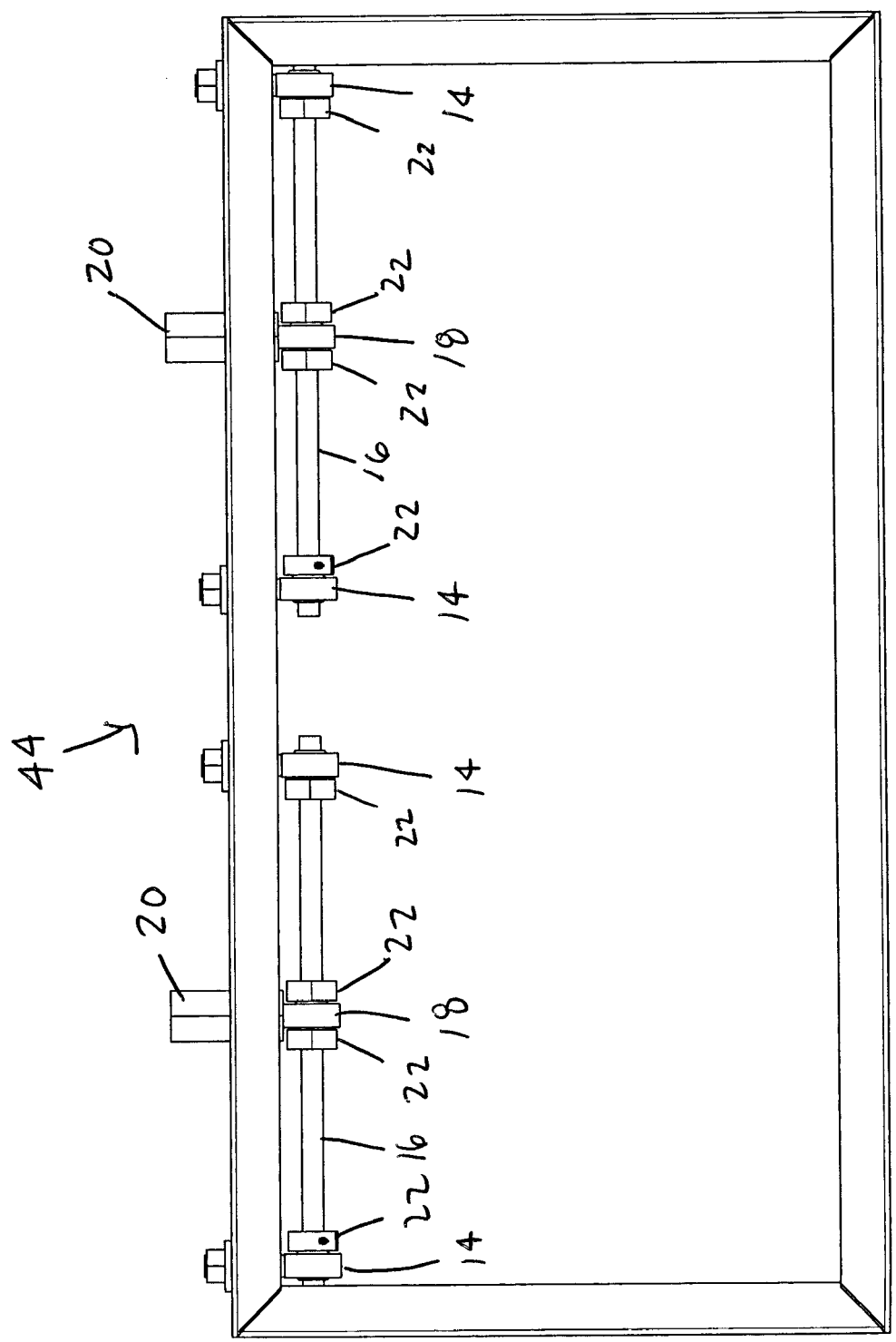
FIG. 15 is a side view of the side frame of FIG. 14.
Figure 18:
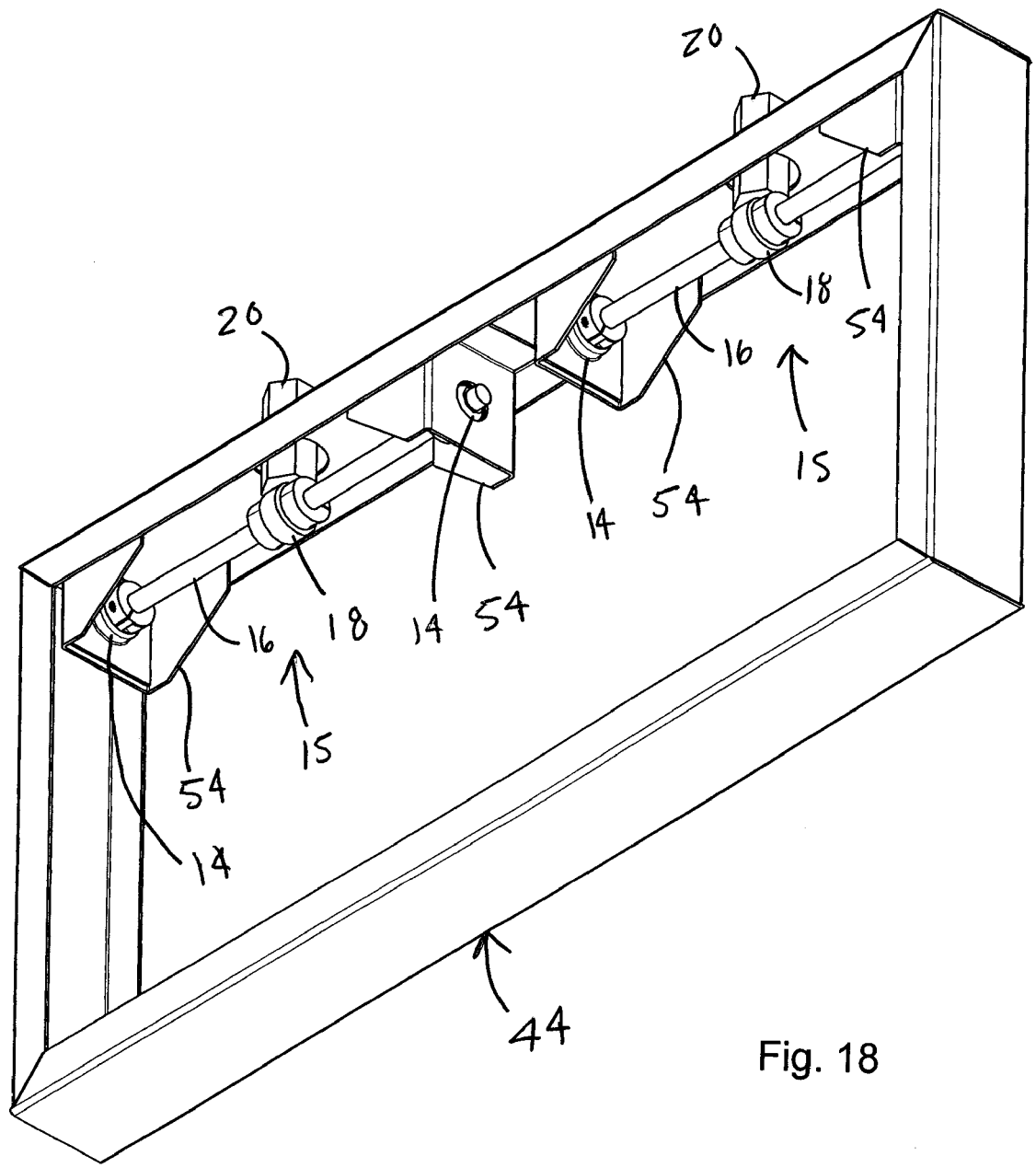
FIG. 18 is a perspective view of a side frame having alternative KESI units for the pedestal isolator of FIGS. 11 to 13.
Figure 19:
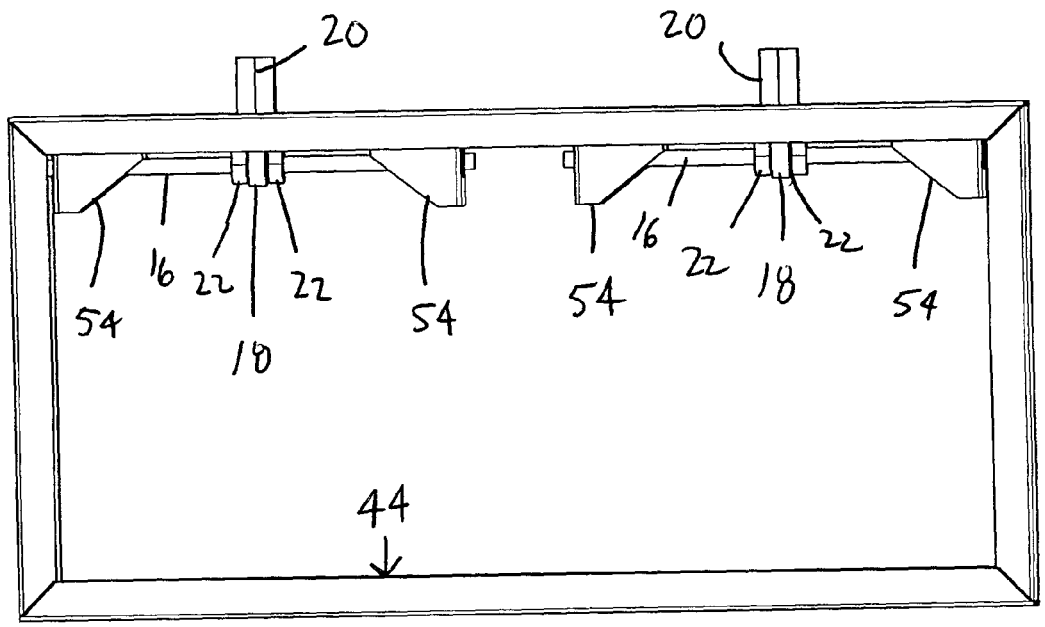
FIG. 19 is a side view of the side frame of FIG. 18.
Figure 20:
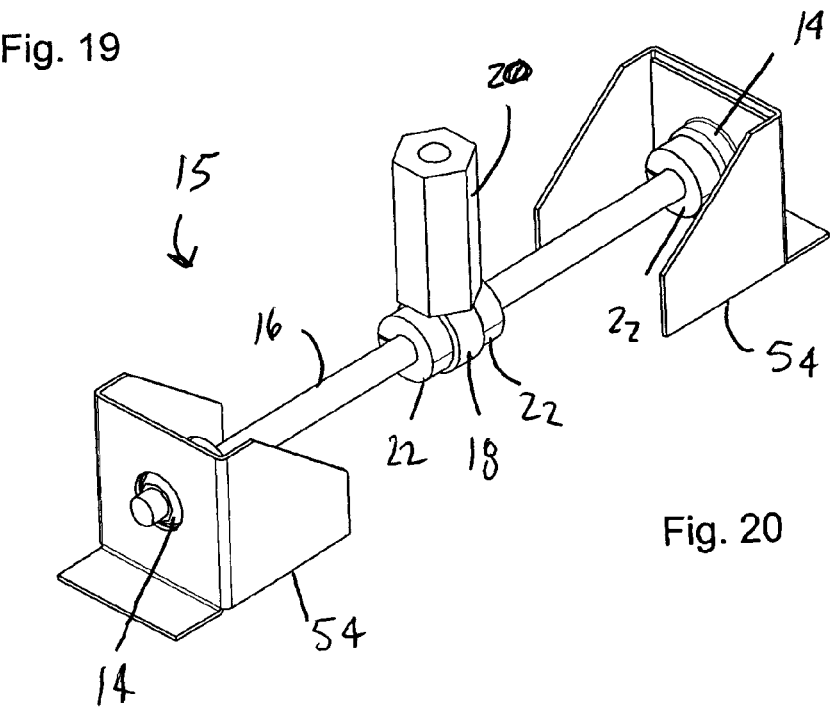
FIG. 20 is a perspective view of one if the alternative KESI units of the side frame of FIGS. 18 and 19.
Figure 21:
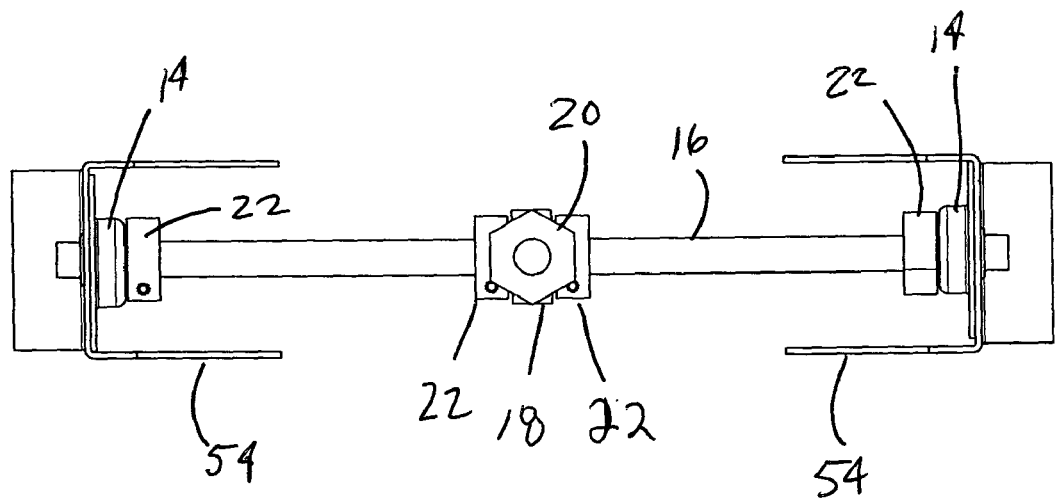
FIG. 21 is a top view of the KESI unit of FIG. 20.
Figure 22:
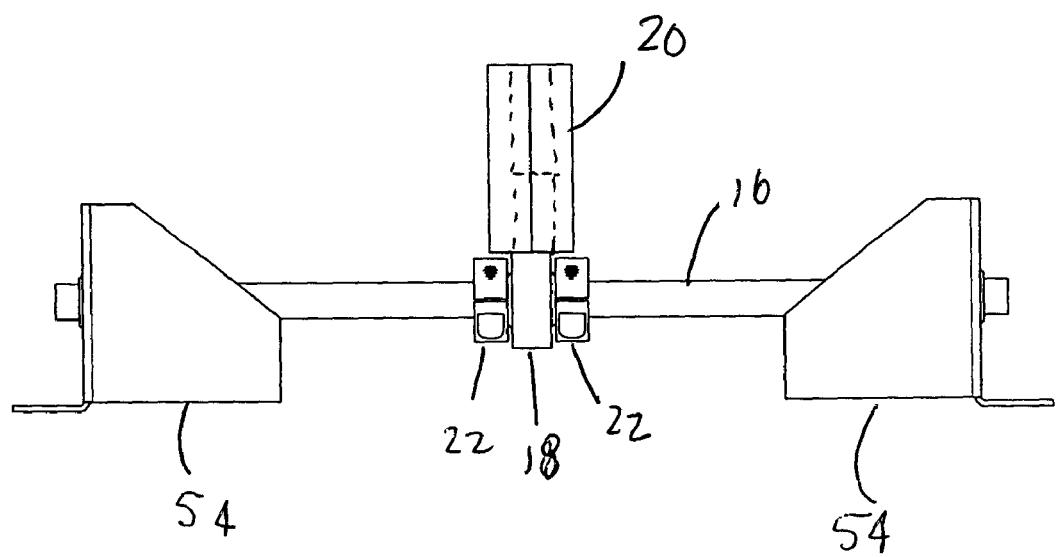
FIG. 22 is a side view of the KESI unit of FIGS. 20 and 21.

As best shown in FIGS. 14 and 15, the illustrated side frames 44 are each constructed of channel sections wherein the channel sections face inward. Constructed in this manner a pair if the KESI units 15 can be secured to the top of the side frame 44 within the channel section. The illustrated side frame has a pair of the KESI units 15 positioned so that the two elongated members 16 horizontally extend in the forward rearward direction in a coaxial manner. The knife edge supports 14 are rigidly secured to the side frame 44 with lock nuts and washers as described above with regard to the platform isolator 10. It is noted that the knife edge supports 14 can alternatively be secured to the side frame 44 in any other suitable manner. The side frame 44 and the cover member 46 are each provided with clearance openings 52 so that the connector mounts 20 can extend upwardly therethrough to the washing machine 13.

The pedestal isolator 40 according to the present invention comprises n elongated members 16, where n≧3. The illustrated pedestal isolator 40 includes four of the KESI units 15, that is, four knife-edge supported elongated members 16. There are two of the KESI units 15 secured to each of the two side frames 44. It is noted, however, that any other suitable quantity of three or more of the KESI units 15 can alternatively be utilized (other than a collinear three-member arrangement). The elongated members 16 may be supported in substantially the same horizontal plane or in different horizontal planes.

The knife-edge supports 14 may be arranged in any suitable configuration such that the elongated members 16 are positioned to support the size and weight of the washing machine or other vibration source 13 supported thereon and respond to the expected vibration frequencies of the source. The illustrated pedestal isolator has a pair of collinear elongated members located on each lateral side of the pedestal 42 such that the pairs are arranged in substantially parallel relationship. The washing machine 13 has a spinning basket 56 which spins about a horizontal spinning axis 58 extending in the forward rearward direction such that the elongated members 16 are arranged in substantially parallel relationship with the spinning axis 58. Preferably, a distance between the respective knife-edge supports 14 for each elongated member 16 is fixed based on the operating frequency of the spinning basket 56 and can be adjustable as discussed above. The illustrated arrangement of the four KESI units 15 was selected to control the range of rocking motion of an exemplary vibration source (the washing machine) 13, but this does not exclude other arrangements (such as the disclosed parallel and angular arrangements of the platform isolator 10) for this or other applications.

FIGS. 18 to 21 illustrate a variation of the KESI units 15 wherein knife-edge supports 14 are secured to the side frame 44 utilizing mounting brackets 54. The illustrated mounting brackets are side and shaped to capture the knife edge supports 14 and to fit within the channel section of the side frame 44. The illustrated mounting brackets 54 are formed of sheet metal but can alternatively be formed of any other suitable material and in any other suitable manner. The mounting brackets 54 can be secured to the side frame 44 in any suitable manner such as, for example, threaded fasteners, rivets, welding, adhesive, or the like.

It is noted that each of the features of the various disclosed embodiments of the present invention can be utilized in any combination with each of the other disclosed embodiments of the present invention.

The preferred embodiments of this invention can be achieved by many techniques and methods known to persons who are skilled in this field. To those skilled and knowledgeable in the arts to which the present invention pertains, many widely differing embodiments will be suggested by the foregoing without departing from the intent and scope of the present invention. The descriptions and disclosures herein are intended solely for purposes of illustration and should not be construed as limiting the scope of the present invention.

What is claimed is:

1. An isolator in combination with a front-loading washing machine, comprising:
    a front loading washing machine having a frame;
    a platform having an upper surface;
    wherein the washing machine rests on the platform;
    a base located below the platform,
    n elongated members wherein n>3;
    wherein each of the elongated members has opposing ends and a central portion intermediate the ends;
    a plurality of knife-edge supports secured to the base and engagingly supporting each of the n elongated members at positions spaced inwardly from the ends;
    a plurality of connectors secured to the platform;
    wherein the connectors are secured to the central portions of the n elongated members so that the elongated members support the platform and the washing machine thereon; and
    wherein mobility of the washing machine increases during operation of the washing machine as a result of softness of the elongated members.

2. The isolator and washing machine of claim 1, wherein the plurality of knife-edge supports is arranged such that each of the n elongated members is supported in substantially the same horizontal plane.

3. The isolator and washing machine of claim 1, wherein the knife-edge supports are selected from spherical-joint rod ends, spherical joint bearings, and radius bore supports.

4. The isolator and washing machine of claim 1, wherein the connectors are selected from a spherical-joint rod end, a spherical joint bearing, and a radius bore support.

5. The isolator and washing machine of claim 1, wherein the base defines preselected positions for fixedly connecting the knife-edge supports and wherein the preselected positions determine the frequency response of the elongated members.

6. The isolator and washing machine of claim 1, wherein n=4.

7. The isolator and washing machine of claim 6, wherein at least two of the elongated members are arranged in substantially parallel relationship.

8. The isolator and washing machine of claim 1, wherein the vibration source is a front-loading washing machine and at least one of the elongated members is arranged in substantially parallel relationship with a spinning axis of a spinning basket of the washing machine.

9. The isolator and washing machine of claim 8, wherein there are four of the respective knife-edge members arranged in substantially parallel relationship with the spinning axis of the spinning basket of the washing machine.

10. A pedestal in combination with a front-loading washing machine, comprising:
    a front loading washing machine having a frame and a spinning basket located within and supported by the frame;
    a base located below the washing machine to support the washing machine above the base;
    n elongated members, wherein n>3;
    wherein each of the elongated members has opposing ends and a central portion intermediate the ends;
    a plurality of knife-edge supports secured to the base and engagingly supporting each of the n elongated members at positions spaced inwardly from the ends;
    a plurality of connectors directly connected to the frame of the washing machine and supporting the washing machine;
    wherein the connectors are secured to the central portions of the n elongated members between the knife-edge supports so that the elongated members support the frame of the washing machine; and
    wherein the spinning drum is supported by the base only through the elongated members so that mobility of the washing machine increases during operation of the washing machine as a result of softness of the elongated members.

11. The pedestal and washing machine of claim 10, wherein the plurality of knife-edge supports is arranged such that each of the n elongated members is supported in substantially the same horizontal plane.

12. The pedestal and washing machine of claim 10, wherein the knife-edge supports are selected from spherical-joint rod ends, spherical joint bearings, and radius bore supports.

13. The pedestal and washing machine of claim 10, wherein the connectors are selected from a spherical-joint rod end, a spherical joint bearing, and a radius bore support.

14. The pedestal and washing machine of claim 10, wherein the base defines preselected positions for fixedly connecting the knife-edge supports and wherein the preselected positions determine the frequency response of the elongated members.

15. The pedestal and washing machine of claim 10, wherein n=4.

16. The pedestal and washing machine of claim 15, wherein at least two of the elongated members are arranged in substantially parallel relationship.

17. The pedestal and washing machine of claim 10, wherein the spinning basket spins about a horizontal spinning axis and at least one of the elongated members is arranged in substantially parallel relationship with the spinning axis.

18. The pedestal and washing machine of claim 17, wherein the there are four of the respective knife-edge members arranged in substantially parallel relationship with the spinning axis of the spinning basket.

19. The pedestal and washing machine of claim 10, wherein the base includes a storage drawer selectively inserted and withdrawn through an opening in a front side of the base.

20. The pedestal and washing machine of claim 10, wherein the base forms a hollow interior space and wherein the elongated members are located in the hollow interior space and the connectors are secured to the elongated members within the hollow interior space of the base and extend through clearance openings in the base to the frame of the washing machine.

21. A pedestal in combination with a front-loading washing machine, comprising:
    a front loading washing machine having a frame;
    wherein the frame supports a spinning basket therein which spins about a horizontal spinning axis;
    a base located below the washing machine to support the washing machine above the base;
    n elongated members, wherein n=4;
    wherein each of the elongated members has opposing ends and a central portion intermediate the ends;
    wherein at least one of the elongated members is arranged in substantially parallel relationship with the spinning axis;
    a plurality of knife-edge supports secured to the base and engagingly supporting each of the n elongated members at positions spaced inwardly from the ends such that the ends are restrained from longitudinal movement;
    a plurality of connectors directly connected to the frame of the washing machine and supporting the washing machine;

wherein the connectors are secured to the central portions of the n elongated members between the knife-edge supports so that the elongated members support the frame of the washing machine; and wherein the spinning drum is supported by the base only through the elongated members so that mobility of the washing machine increases during operation of the washing machine as a result of softness of the elongated members.

22. The pedestal and washing machine of claim 21, wherein each of the elongated members is arranged in substantially parallel relationship with the spinning axis.

23. The pedestal and washing machine of claim 21, wherein the base includes a storage drawer selectively inserted and withdrawn through an opening in a front side of the base.

24. The pedestal and washing machine of claim 21, wherein the base forms a hollow interior space and wherein the elongated members are located in the hollow interior space and the connectors are secured to the elongated members within the hollow interior space of the base and extend through clearance openings in the base to the frame of the washing machine.

* * * * *